US012544778B2

(12) United States Patent
Alluigi

(10) Patent No.: US 12,544,778 B2
(45) Date of Patent: Feb. 10, 2026

(54) TRIGGER DISPENSING HEAD WITH REDUCED PISTON CHAMBER

(71) Applicant: GUALA DISPENSING S.P.A., Alessandria (IT)

(72) Inventor: Riccardo Alluigi, Alessandria (IT)

(73) Assignee: Guala Dispensing S.P.A., Spinetta Marengo (IT)

(*) Notice: Subject to any disclaimer, the term of this patent is extended or adjusted under 35 U.S.C. 154(b) by 173 days.

(21) Appl. No.: 18/688,847

(22) PCT Filed: Oct. 20, 2022

(86) PCT No.: PCT/IB2022/060079
§ 371 (c)(1),
(2) Date: Mar. 4, 2024

(87) PCT Pub. No.: WO2023/067534
PCT Pub. Date: Apr. 27, 2023

(65) Prior Publication Data

US 2024/0382989 A1 Nov. 21, 2024

(30) Foreign Application Priority Data

Oct. 22, 2021 (IT) ........................ 102021000027218

(51) Int. Cl.
*B05B 11/00* (2023.01)
*B05B 11/10* (2023.01)

(52) U.S. Cl.
CPC ....... *B05B 11/0044* (2018.08); *B05B 11/1011* (2023.01); *B05B 11/1064* (2023.01)

(58) Field of Classification Search
CPC ............. B05B 11/0044; B05B 11/1011; B05B 11/1064; B05B 11/0008
See application file for complete search history.

(56) References Cited

U.S. PATENT DOCUMENTS

| | | | | |
|---|---|---|---|---|
| 4,489,861 | A * | 12/1984 | Saito | B05B 11/1011 137/853 |
| 9,962,724 | B2 * | 5/2018 | Fujiwara | B05B 11/1002 |
| 10,518,281 | B2 | 12/2019 | Fujiwara | |
| 2006/0086763 | A1 | 4/2006 | Foster | |
| 2007/0284393 | A1 | 12/2007 | Ritsche et al. | |
| 2015/0151315 | A1 * | 6/2015 | Alluigi | B05B 11/007 222/380 |
| 2019/0176177 | A1 * | 6/2019 | Fujiwara | B65D 83/00 |
| 2020/0316630 | A1 | 10/2020 | Alluigi | |

FOREIGN PATENT DOCUMENTS

| | | | |
|---|---|---|---|
| WO | 2022175867 | A1 | 8/2022 |
| WO | 2023275732 | A1 | 1/2023 |

OTHER PUBLICATIONS

International Search Report for International Patent Application No. PCT/IB2022/060079, mailed Dec. 19, 2022.

* cited by examiner

*Primary Examiner* — Vishal Pancholi
(74) *Attorney, Agent, or Firm* — Armstrong Teasdale LLP

(57) ABSTRACT

Provided is a trigger dispensing head applicable to a bottle of a trigger dispensing device having a cylinder chamber, a main vent passage, a sleeve, a secondary vent passage, a manually-operable piston, a suction duct, and a dispensing duct. The sleeve is provided with an annular inner sleeve wall delimiting a pressure chamber, and an annular outer sleeve wall externally spaced from the annular inner sleeve wall.

12 Claims, 14 Drawing Sheets

TRIGGER DISPENSING HEAD WITH REDUCED PISTON CHAMBER

CROSS-REFERENCE TO RELATED APPLICATIONS

This application is a National Stage Application of International Patent Application No. PCT/IB2022/060079, having an International Filing Date of Oct. 20, 2022, which claims priority to Italian Application No. 102021000027218, filed Oct. 22, 2021, the entire contents of each of which are hereby incorporated by reference herein.

FIELD OF THE INVENTION

The present invention is in the field of trigger dispensing devices. In particular, the object of this invention is a trigger dispensing head which is applicable to a bottle and provided with a piston chamber reduction device.

BACKGROUND OF THE INVENTION

Trigger dispensing devices are enormously popular today; several hundred million units are manufactured and sold each year.

These devices are used to dispense liquid products for countless uses, for example hygiene of household surfaces, car cleaning, and plant and animal care.

Exemplary embodiments are shown, for example, in the international PCT/IB2022/055978 and WO-A1-2022/175867 on behalf of the Applicant.

In some sectors, for example in the area of products dedicated to protecting skin and hair from the effects of the sun, also known as "sun care," or in the area of "aircare" products dedicated to the air quality of an environment, dispensing devices are specially designed to deliver doses in reduced quantities. Preferably, the term reduced dose refers to amounts of less than one milliliter, for example equal to 0.6 milliliters. More generally, in areas such as those indicated above, the dose delivered is roughly half the amount typically delivered for other uses, such as compared to devices in the "home care" sector.

The manufacture of dispensing devices suitable for delivering doses in reduced quantities requires the complex miniaturization of the parts thereof. Specifically, in order to achieve such a reduction in the delivered dosage, without varying the stroke of the moving parts, the bore of the head frame must be varied. Such modifications are however severely limited by compliance with molding conditions, thereby complicating the design and production thereof. Examples of structurally complex trigger dispensing heads are, for example, described in US-A1-2020/316630, U.S. Pat. No. 10,518,281 B2 and US-A1-2007/284393.

There is therefore a strong need for a dispensing device suitable for dispensing doses in reduced quantities that is both simple and advantageous to manufacture.

OBJECT OF THE INVENTION

The object of this invention is that of providing a trigger dispensing head that meets the aforesaid requirements and overcomes the aforementioned drawbacks.

This object is achieved by a trigger dispensing head as described and claimed herein. Advantageous embodiments of the present invention are also described.

BRIEF DESCRIPTION OF THE DRAWINGS

The features and advantages of the dispensing head according to this invention will be apparent from the description below, given by way of non-limiting example in accordance with the figures in the appended drawings, wherein.

DETAILED DESCRIPTION

Figure 1:
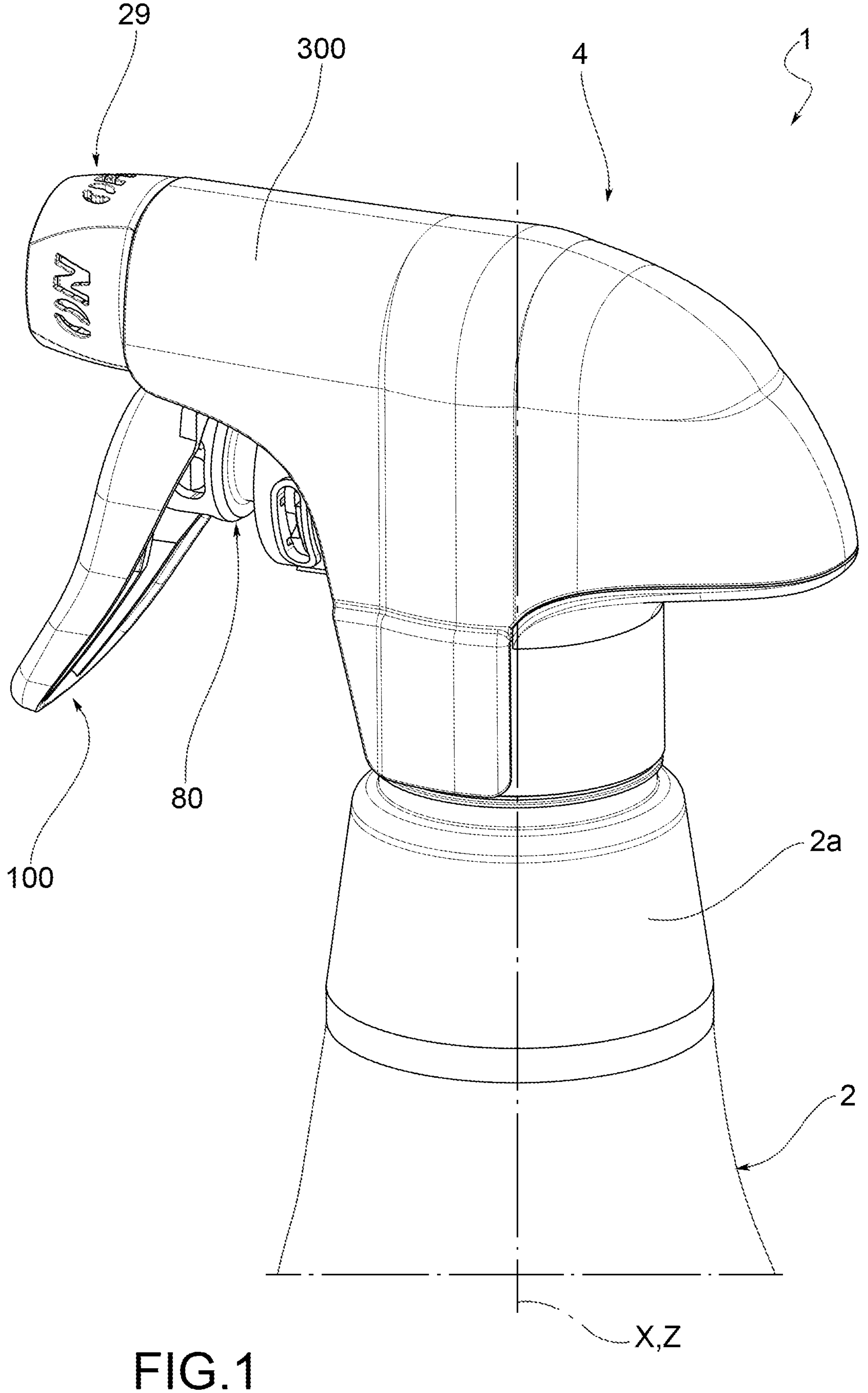
FIG. 1 depicts a trigger dispensing device according to an embodiment of the present invention.
Figure 2A:
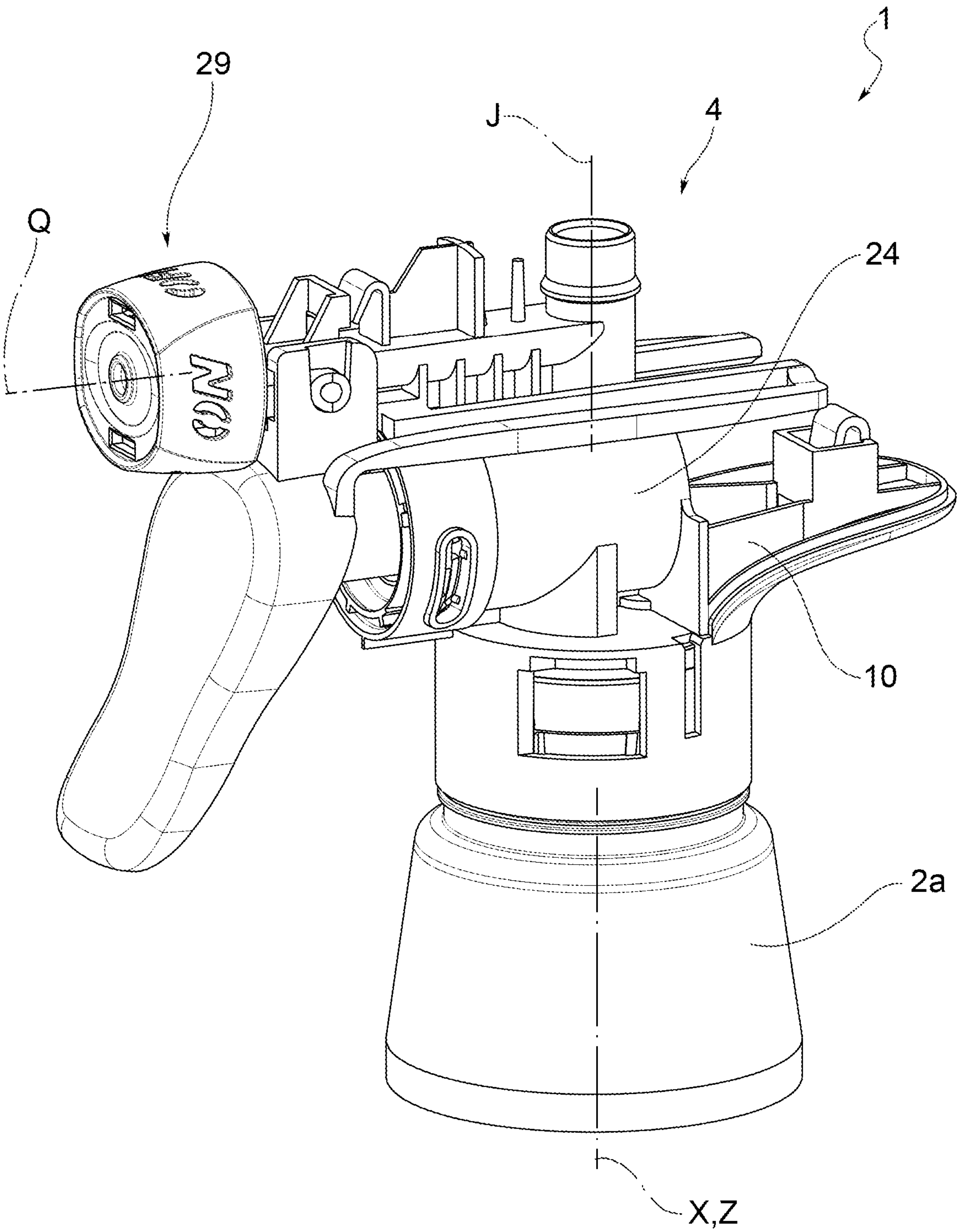
FIG. 2*a* shows a trigger dispensing head without the shell.
Figure 2B:
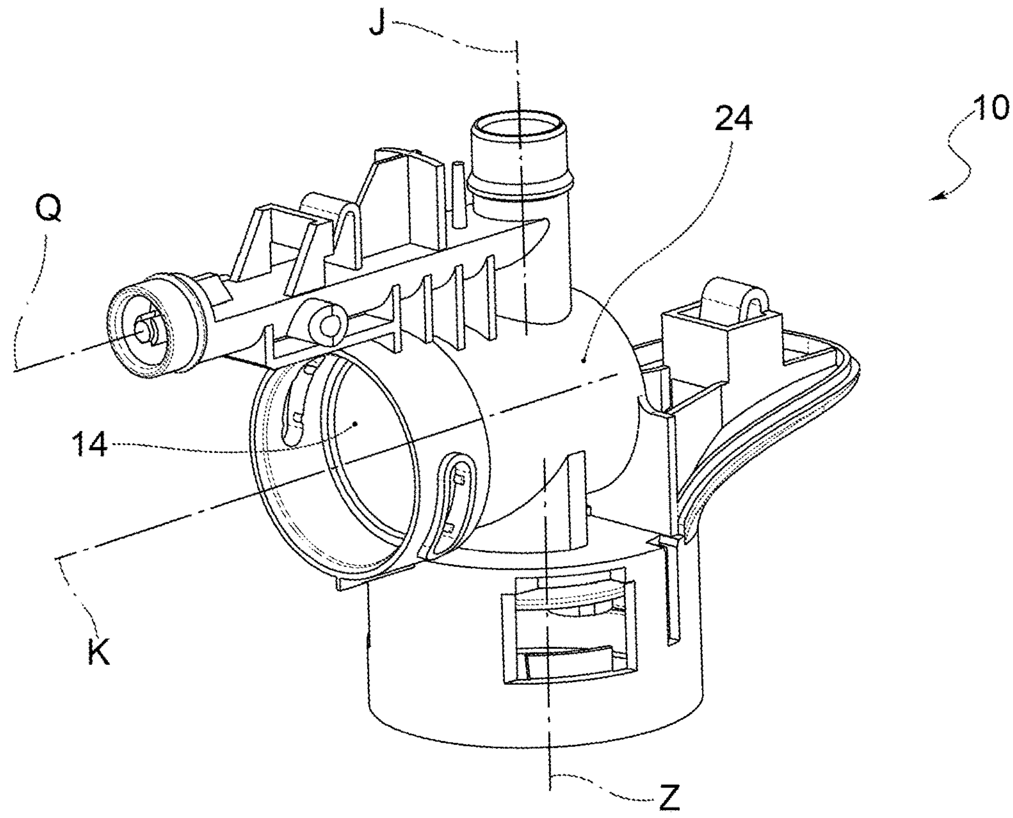
FIGS. 2*b* and 2*c* show a frame of the dispensing head and a sectional view thereof, respectively.
Figure 2C:
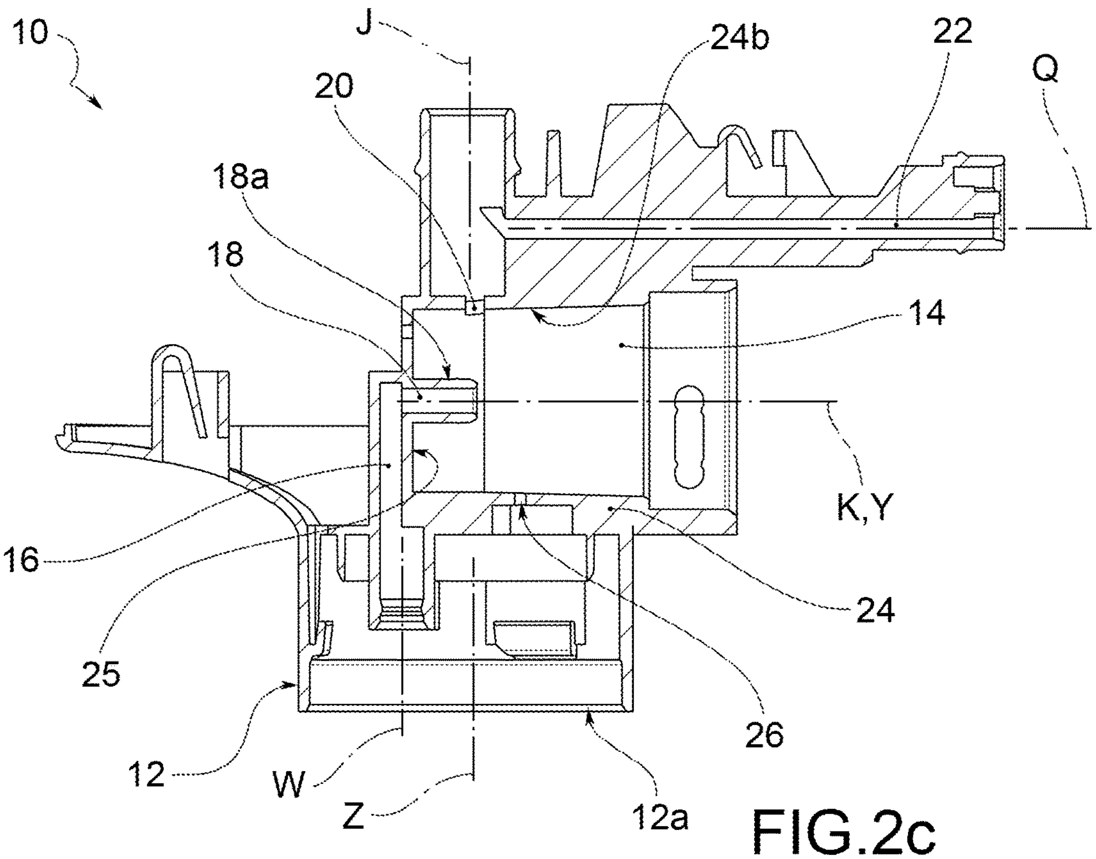

With reference to the figures of the appended drawings, a trigger dispensing device comprising a bottle 2 for containing a liquid product to be dispensed and a trigger dispensing head 4 applied to a neck 2*a* of the bottle has been collectively referred to as 1. The neck 2*a* has a neck axis X. Preferably, the head 4 is applicable to the bottle 2 by means of a ferrule system comprising a threaded ferrule 6 which may be screwed to the neck 2*a* or, according to a variant embodiment, by means of a bayonet system, preferably equipped with an anti-removal ridge.

The head 4 comprises a frame 10, preferably made in one piece of plastics material, for example by injection molding, adapted to support the components of the head 4.

The frame 10 comprises an attachment portion 12 provided with a main opening 12*a* having an attachment axis Z; when the head 4 is applied to the neck 2*a*, the main opening 12*a* is in communication with a compartment inside the neck 2*a*, and the attachment axis Z is coincident with the neck axis X.

The head 4 also comprises a cylinder chamber 14, of cylindrical circular shape, for example having a chamber axis K orthogonal to the attachment axis Z; preferably, the cylinder chamber 14 is formed in the frame 10.

The head 4 further comprises a suction duct that connects the main opening 12*a* with the cylinder chamber 14.

Preferably, said suction duct comprises a first suction segment 16 which, starting from the main opening 12*a*, extends along a first suction axis W, parallel to and preferably spaced apart from the attachment axis Z, and a second suction segment 18 which flows into the cylinder chamber 14 and extends along a second suction axis Y, parallel to the chamber axis K; for example, the second suction axis Y is coincident with the chamber axis K. The second suction segment 18 is delimited by a suction mouth 18*a*.

Preferably, moreover, the first suction segment 16 and/or the second suction segment 18 are formed in the frame 10.

The head 4 further comprises a dispensing duct that puts the cylinder chamber 14 in communication with the external environment.

Preferably, the dispensing duct comprises a first dispensing segment 20 which, starting from the cylinder chamber 14, extends along a first suction axis J incident, for example orthogonal, to the chamber axis K, and a second dispensing segment 22 which opens into the external environment and extends along a second dispensing axis Q parallel to the chamber axis K.

Preferably, moreover, the first dispensing segment 20 and/or the second dispensing segment 22 are formed in the frame 10.

Preferably, the dispensing head 4 further comprises a nozzle assembly 29, applied to the free end of the second dispensing segment 22, and preferably rotatable at least between a dispensing position, in which the second dispensing segment 22 is in communication with the external environment, and a closed position, in which fluid communication between the second dispensing segment 22 and the external environment is prevented.

Preferably, the first dispensing segment 20 is positioned in a rear region of the dispensing head 4, and the nozzle assembly 29 is positioned in a front region of the dispensing head 4.

The dispensing head 4 comprises a cylinder wall 24, having an inner chamber surface 24*b* which annularly delimits the cylinder chamber 14. The cylinder chamber 14 is axially delimited by a bottom wall 25, for example from which the suction mouth 18*a* of the second suction segment 18 protrudes.

Preferably, the cylinder wall 24 and the bottom wall 25 are formed in the frame 10.

According to one embodiment, in the cylinder wall 24, a main vent passage 26 is formed which puts the main opening 12*a* in communication with the cylinder chamber 14, for example with the inner chamber surface 24*b*.

The head 4 further comprises a sleeve 30 inserted into the cylinder chamber 14 along the chamber axis K, having an inner sleeve surface 32*a* that annularly delimits a pressure chamber 30*a* in which a piston 80 flows sealingly, which will be described hereinafter.

In accordance with an embodiment, the sleeve 30, the cylinder wall 24 and the bottom wall 25 define a valve compartment 25' in the cylinder chamber.

According to a first embodiment, the sleeve 30 is received in a fixed angular position, i.e. constrained to rotate around the chamber axis K, in such a way as to implement the solution referred to in the international application PCT/IB2022/055978 on behalf of the Applicant; the teaching thereof is expressly incorporated herein.

In accordance with a second embodiment, the sleeve is rotatable within the cylinder chamber 14 around the chamber axis K, in such a way as to implement the solution referred to in the international application WO-A1-2022/175867 on behalf of the Applicant; the teaching thereof is expressly incorporated herein.

The sleeve 30 has a sleeve axis M and comprises a bottom sleeve wall 34 transverse to the sleeve axis M, preferably having an annular end wall 36 defining a bottom opening 38 of the sleeve 30. The suction duct flows into the sleeve 30 through the bottom opening 38; in particular, the second suction segment 18 opens into the sleeve 30, for example in the compartment delimited by the annular end wall 36.

The sleeve 30 comprises an annular inner sleeve wall 32 that extends axially from the bottom sleeve wall 34 and annularly delimits the pressure chamber 30*a*. In addition, the sleeve 30 comprises an annular outer sleeve wall 66 that extends axially from the bottom sleeve wall 34 positioned externally radially spaced from the inner sleeve wall 32 and put in contact with the inner chamber surface 24*b*.

In particular, the outer sleeve wall 66 has an annular outer surface 66*a*, positioned directly in contact with the inner chamber surface 24*b*. Preferably, the outer surface 66*a* has a converging truncated conical shape, for example converging at the rear.

In one embodiment, the inner sleeve wall 32 and the outer sleeve wall 66, both having, for example, cylindrical shapes, are concentric and spaced in the radial direction with respect to the sleeve axis M, annularly defining an annular sleeve gap 98 therebetween.

In one embodiment, the sleeve 30 is open at a free sleeve end 33 axially opposite the bottom sleeve wall 34, having a head opening 330 delimited by a sleeve edge 33*a*. Preferably, the annular sleeve gap 98 is open at said free sleeve end 33.

The sleeve 30 also has a closing wall 39 positioned transversely to the sleeve axis M between the inner sleeve wall 32 and the outer sleeve wall 66, i.e. having an at least partially annular course, in such a way as to divide the annular sleeve gap 98, along the sleeve axis M, into a first sleeve compartment 981, closed by the bottom sleeve wall 34, and an opposite second sleeve compartment 982, towards the free sleeve end 33. In other words, said second sleeve compartment 982 is open and axially accessible through the head opening 330.

The sleeve 30 has a secondary vent passage 50 passing through the inner sleeve wall 32 and the outer sleeve wall 66, suitable for putting the main vent passage 26 in communication with the external environment. In particular, the secondary vent passage 50 is open between the outer surface 66*a* and the inner chamber surface 24*b*, i.e. it is suitable for putting the pressure chamber 30*a* in communication with the cylinder chamber 14.

The sleeve 30 is provided with an annular vent wall 501 that extends in a radial direction with respect to the sleeve axis M, between the inner sleeve wall 32 and the outer sleeve wall 66, internally delimiting the secondary vent passage 50 therein. In other words, said annular vent wall 501 has an incident vent axis S, for example orthogonal to the sleeve axis M.

Preferably, said annular vent wall 501 is positioned at the closing wall 39, for example by subdividing it substantially into two semi-walls symmetrical in relation to the vent axis S.

The sleeve 30 is provided with a pair of angularly spaced partition walls 44, 45 extending from the closing wall 39 to the bottom sleeve wall 34 and defining the angular width of the first sleeve compartment 981.

Preferably, each partition wall 44, 45 is positioned on a relevant plane passing through the sleeve axis M.

Figure 10:
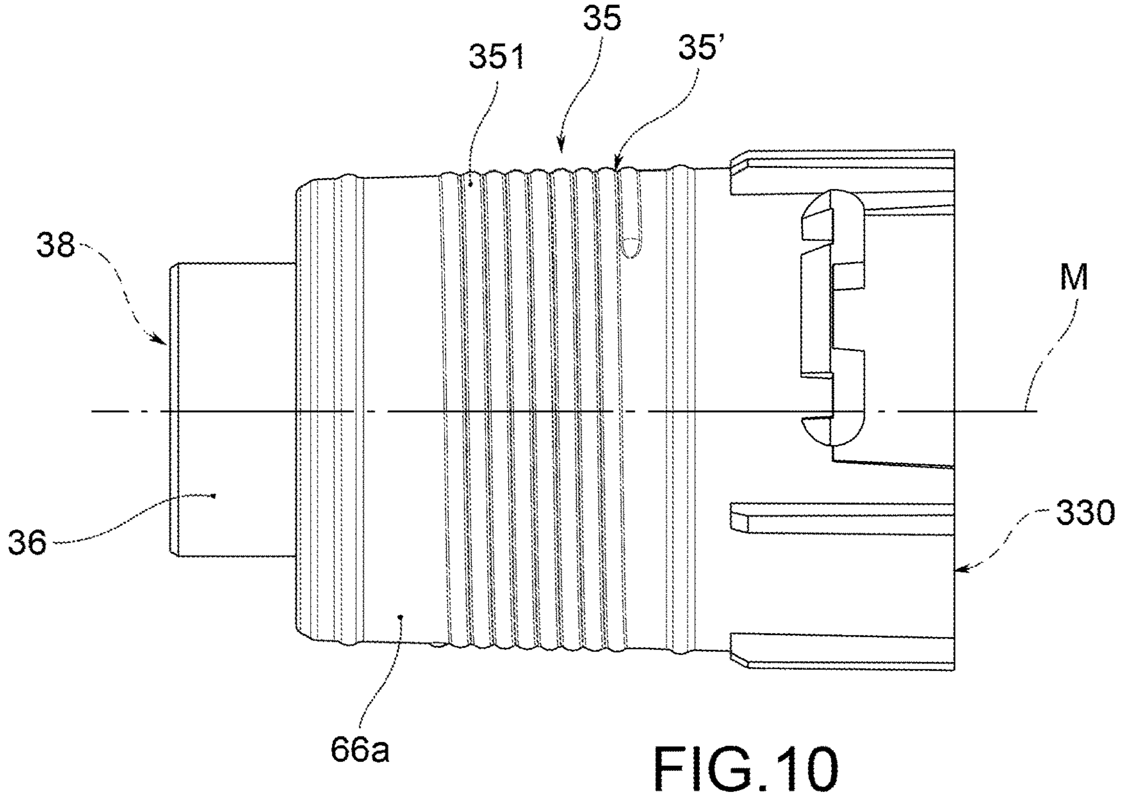
Figure 10B:
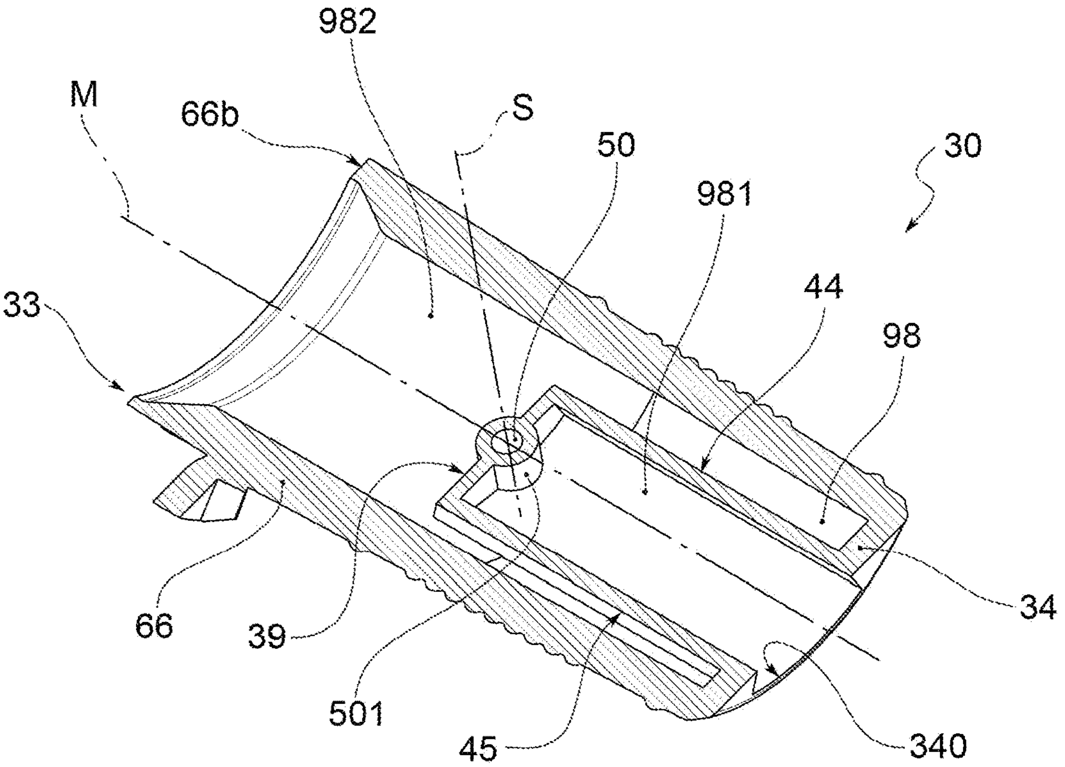
FIGS. 10*a* and 10*b* show a sectional view along a plane passing through the sleeve axis and a sectional view along a plane transverse to the closing wall of the sleeve.
Figure 10A:
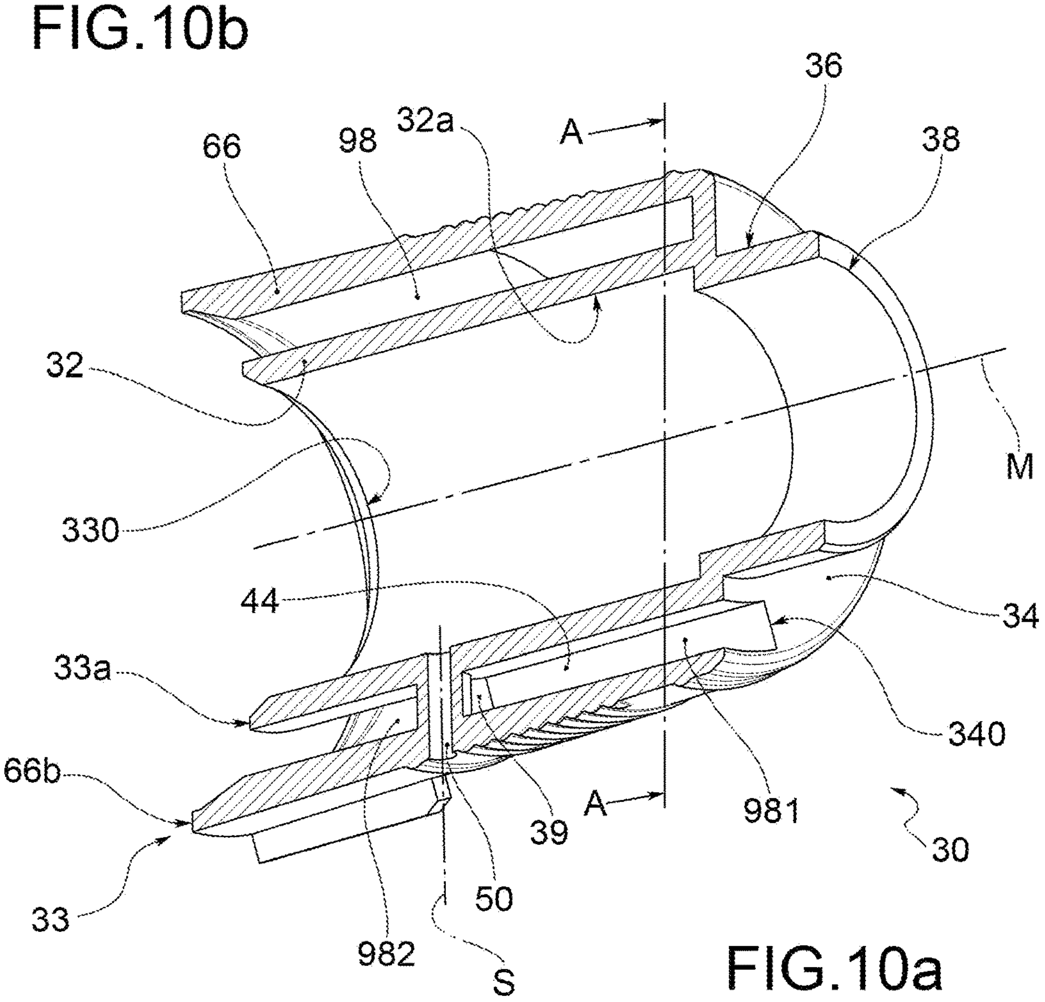

According to one embodiment, the sleeve 30 has a bottom window 340 axially passing through the bottom sleeve wall 34 and positioned in an imaginary plane passing through the sleeve axis M and passing through the secondary vent passage 50, as seen in FIG. 10*a*.

Specifically, the bottom window 340 faces the valve compartment 25', i.e., it puts the first sleeve compartment 981 in communication with said valve compartment 25'.

Figure 10C:
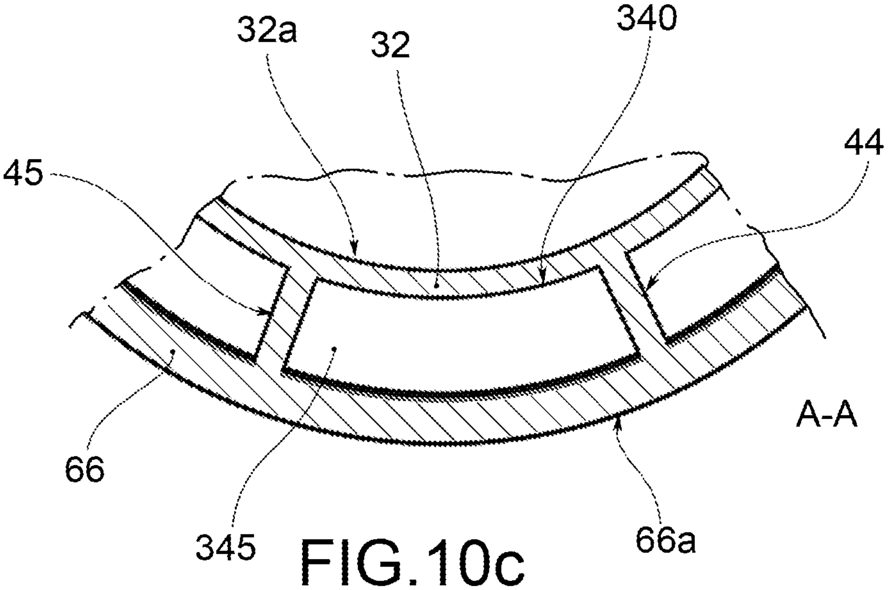
FIG. 10*c* shows an enlarged detail of a cross-sectional view of the sleeve passing through the plane A-A indicated in FIG. 10*a;*
Figure 11:
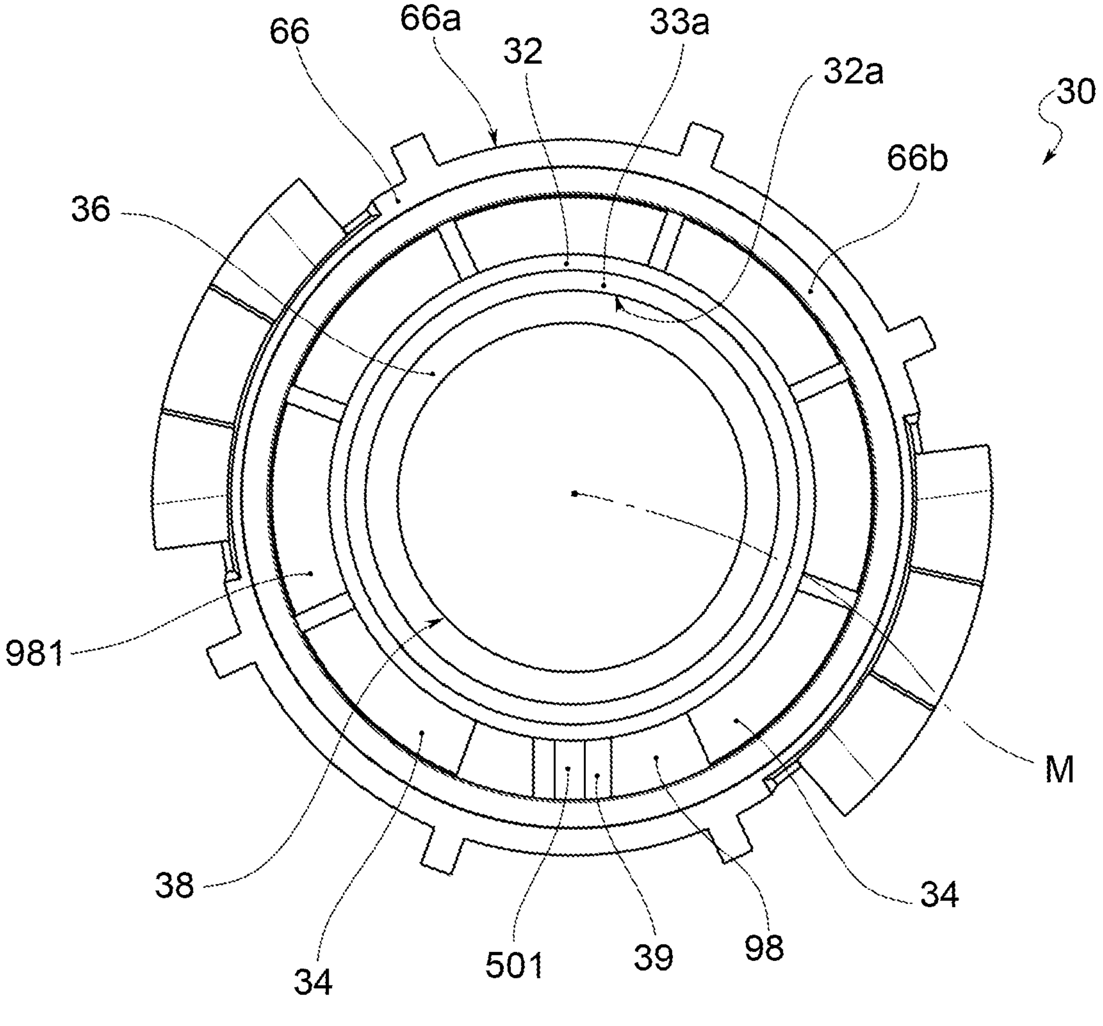
Figure 12:
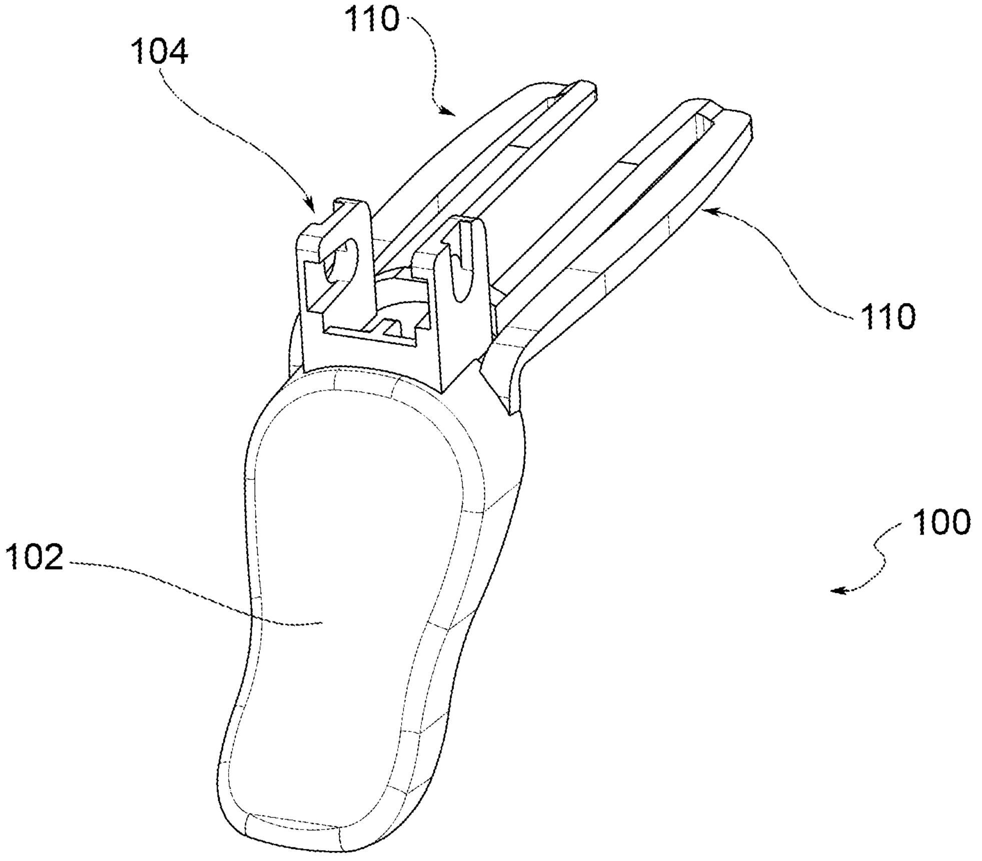
FIGS. 12 and 13 show a trigger of the dispensing head and a sectional view thereof, respectively.
Figure 13:
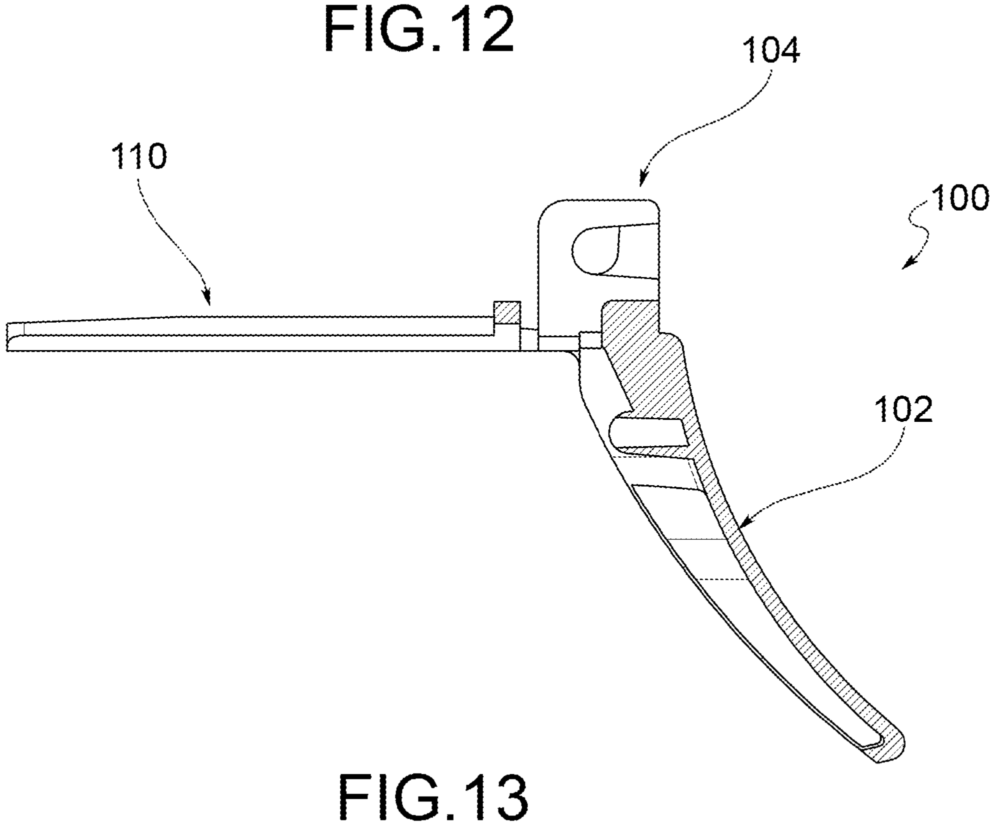
Figure 14:
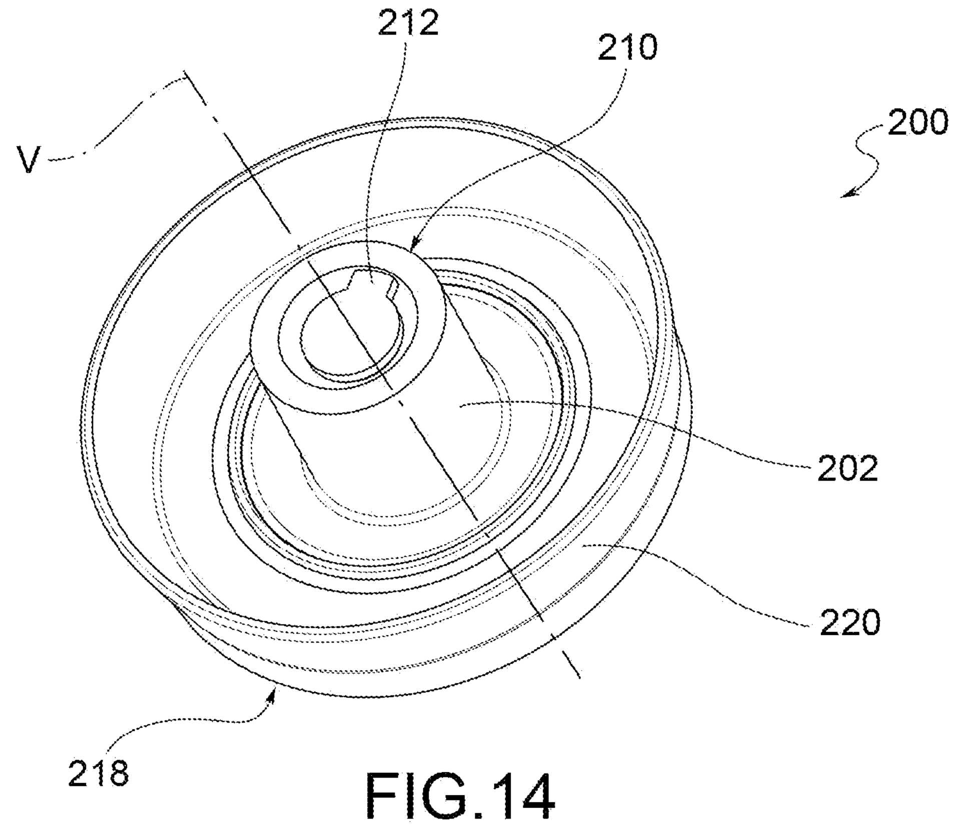
FIGS. 14, 15 and 16 show a valve element of the dispensing head, a plan view thereof and a sectional view thereof, respectively.
Figure 15:
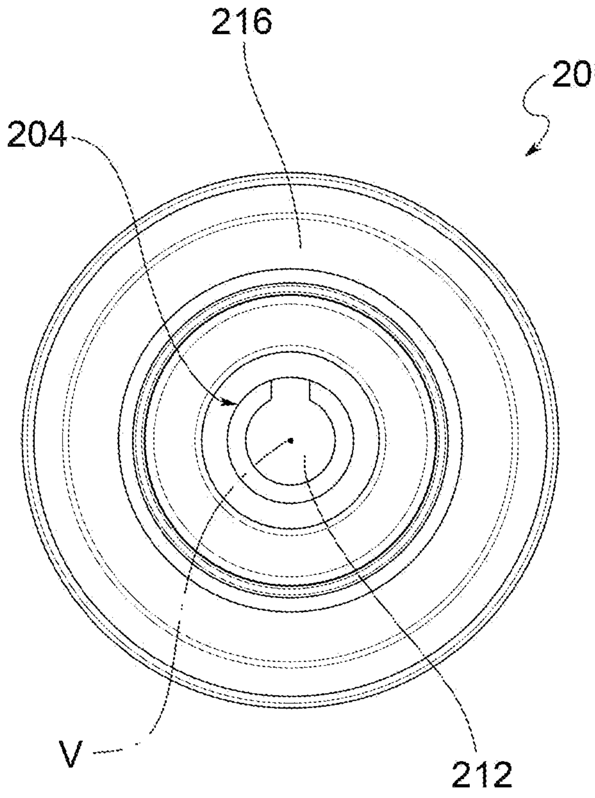
Figure 16:
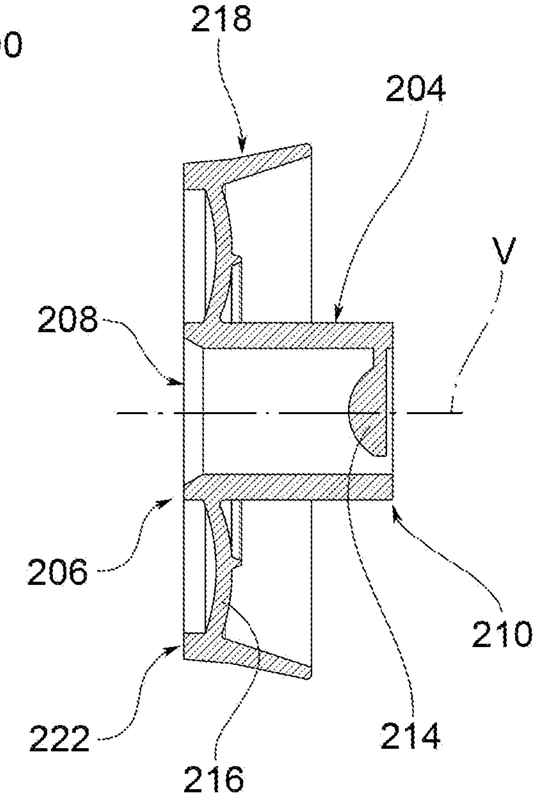

The bottom window 340 opens for a portion of the circular crown 345 radially delimited between the inner sleeve wall 32 and the outer sleeve wall 66 and angularly delimited between the partition walls 44, 45, as seen in FIG. 10*c*.

In other words, the first sleeve compartment 981 is axially closed by the closing wall 39, is angularly delimited by the pair of partition walls 44, 45 and radially between the inner sleeve wall 32 and the outer sleeve wall 66; it is also open at the bottom sleeve wall 34 by means of the bottom window 340.

In one embodiment, the sleeve 30 comprises a labyrinth seal 35 which extends over the outer surface 66*a*, suitable for putting the main vent passage 26 in communication with the external environment.

Preferably, the labyrinth seal 35 comprises a channel 35', suitable for putting the main vent passage 26 in communication with the external environment. For example, the channel 35' has a circumferential or spiral extension. In an embodiment variant, the channel is linear and curvilinear, for example linear in sections.

Furthermore, the sleeve 30 preferably comprises a continuous ridge 351 which laterally defines the channel 35'. In particular, said continuous ridge 351 is positioned in contact with the inner chamber surface 24*b*, thus creating a seal against product leakage.

In other words, the labyrinth seal 35 is shaped to provide a tortuous path suitable for putting the external environment in fluid connection with the main vent passage 26. In fact, the air may be drawn back, for example as a result of a depression, towards an internal compartment of the bottle 2 through the channel 35'; however, a small quantity of liquid that comes out of the main vent passage 26 may not go entirely through the channel 35' and exit outside the dispensing head 4. In particular, the continuous ridge 351 forces the liquid to continue along the channel 35', preventing the leakage, since it forms a channel with the inner chamber surface 24*b*.

Further features of the sleeve and labyrinth seal are contained in the international application PCT/IB2022/055978 on behalf of the Applicant; the teaching thereof is expressly incorporated herein.

The dispensing head 4 further comprises a manually operable piston 80 for translating between an initial rest position and a final end-of-stroke position.

The piston 80 is inserted into the sleeve 30 through the head opening 330 and slides so as to seal the inner sleeve surface 32*a*, i.e., within the pressure chamber 30*a*.

The piston 80, which is preferably hollow and manufactured as a single piece of plastics material, for example by means of injection molding, comprises an annular piston wall 82 extending along a piston axis P between a front end 84 and a rear end 86.

Preferably, the piston 80 comprises a piston bottom 87 at the front end 84. At the rear end 86, the piston 80 has a piston engaging portion 90 provided with, for example, holes 92 for engaging the trigger 100 of the head 4.

Preferably, the piston 80 comprises a circumferential main piston seal 89 and a secondary piston seal 88, projecting externally from the piston wall 82. In particular, inside the sleeve 30, the main piston seal 89 axially delimits the pressure chamber 30*a* together with the bottom wall 25.

Preferably, the secondary vent passage 50 is open on the inner sleeve surface 32*a* between the main piston seal 89 and the secondary piston seal 88, in the initial rest position of the piston 80.

The head 4 further comprises a trigger 100, comprising a lever actuation portion 102 suitable for positioning the user's fingers for actuating the head 4, and a trigger engagement portion 104 for connecting with the piston 80. For example, the trigger 100 is hinged to the piston 80, by means of the engagement of the trigger engagement portion 104 with the piston engagement portion 90 of the piston 80.

Preferably, the head 4 also comprises elastic return means suitable for operating permanently on the piston 80, directly or indirectly, to bring it to an initial position, which will be discussed later. For example, said return means comprise at least one flexible element 110, preferably a pair of flexible elements, made in one piece with the actuation portion 102 of the trigger 100.

The head 4 further comprises valve means suitable for adjusting the product flow from the suction duct to the pressure chamber 30*a* and from the pressure chamber 30*a* to the dispensing duct. Said valve means are accommodated in the valve compartment 25'.

Preferably, said valve means comprise an at least partially flexible valve element 200, made in a single piece, for example by injection molding.

The valve element 200 comprises a tubular portion 202 comprising an annular valve wall 204 extending along a valve axis V, between a rear end 206 defining a rear opening 208, and a front end 210.

The valve element 200 further comprises a flexible flap 212 connected in a cantilevered manner to the front end 210 of the valve wall 204, projecting radially internally.

The flap 212 has, on the side facing the rear opening 208, a shutter portion 214, for example having a flat or hemispherical or truncated-cone shape.

The valve element 200 further comprises an annular membrane 216 that extends radially externally from the tubular portion 202. The membrane 216 is, for example, concave on the side facing the front end 210 of the tubular portion 202.

The valve element 200 further comprises a support portion 218 composed of an annular support wall 220 that connects to and surrounds the membrane 216.

Preferably, the support wall 220 has a flared shape toward the front end 210 of the tubular portion 202 and, on the side facing the rear end 206, a wavy valve base 222 that forms a support for the valve element.

The valve element 200 is located in the cylinder chamber 14, against the bottom wall 25 against which the valve base 222 is placed; the support wall 220, on the other hand, is in contact with the cylinder wall 24 and creates a seal against product leakage.

The tubular portion 202 is threaded onto the suction duct, and in particular onto the second suction segment 18, and the flap 212 forms a flexible shutter for said suction duct. The suction mouth 18*a* of the suction duct and the flexible flap 212 form suitable suction valve means for allowing product to pass from the suction duct to the pressure chamber 30*a* in a suction step and preventing product from passing from the pressure chamber 30*a* to the suction duct in a dispensing step.

The membrane 216 cooperates with the sleeve 30, and in particular closes the bottom opening 38 of the pressure chamber 30*a* and abuts against the end wall 36. The end wall 36 and the membrane 216 form pre-compression valve means suitable for allowing product to pass from the pressure chamber 30*a* to the dispensing duct only when the pressure in the pressure chamber 30*a* exceeds a predetermined threshold value. Said pre-compression valves are also suitable for preventing the product from passing from the dispensing duct to the pressure chamber 30*a* during a suction step.

The valve element 200, cooperating with the suction mouth 18*a* of the suction duct and the end wall 36 of the sleeve, thus integrates both the suction valve means and the pre-compression valve means into a single component.

In normal operation of the trigger dispensing device, the head 4 is applied to the bottle 2, so that the suction duct is in communication with the compartment inside the bottle 2 through the main opening 12*a*.

Figure 3:
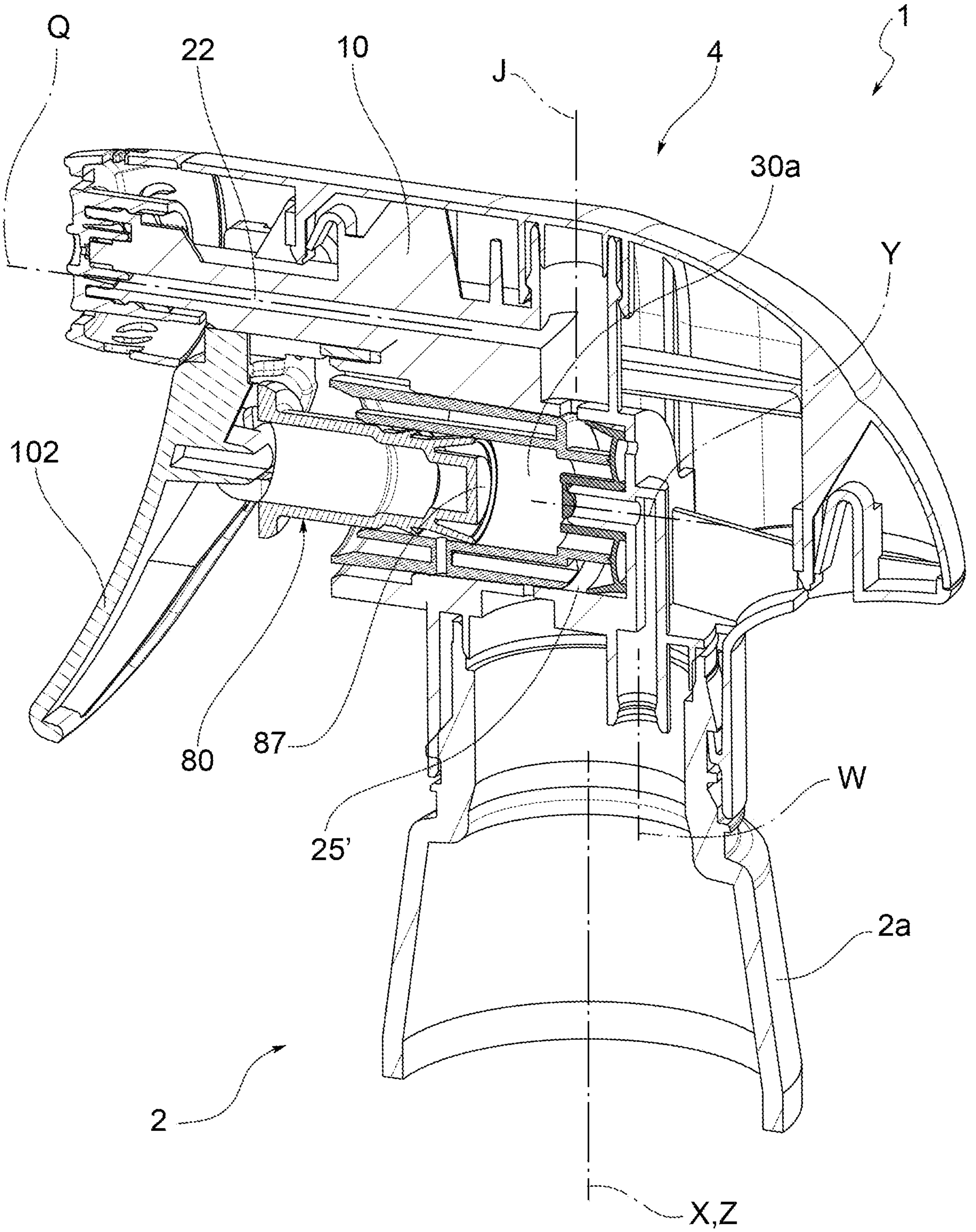
FIG. 3 shows a sectional view of the trigger dispensing device in an initial configuration, according to an embodiment of the present invention.

Preferably, in an initial configuration in which the trigger 100 and the piston 80 are in a relevant initial rest position (FIG. 3), the pre-compression valve means and the valve suction means are in a relevant closed configuration.

Furthermore, preferably, in the initial configuration, the secondary vent passage 50 is axially included between the main piston seal 89 and the secondary piston seal 88 of the piston 80. Furthermore, in the initial configuration, the main vent passage 26 is fluidically isolated from the external environment.

By actuating the trigger 100, the axial translation of the piston 80 occurs, said piston moving within the sleeve 30 and putting pressure on the product contained in the pressure chamber 30*a*.

As long as the secondary piston seal 88 is positioned axially beyond the secondary vent passage 50, the secondary vent passage 50 is in fluid communication with the external environment.

Once a predefined threshold pressure in the pressure chamber 30*a* has been exceeded, the pre-compression valve means switch to an open configuration in which they allow the passage of the product from the pressure chamber 30*a* to the dispensing duct.

Figure 4:
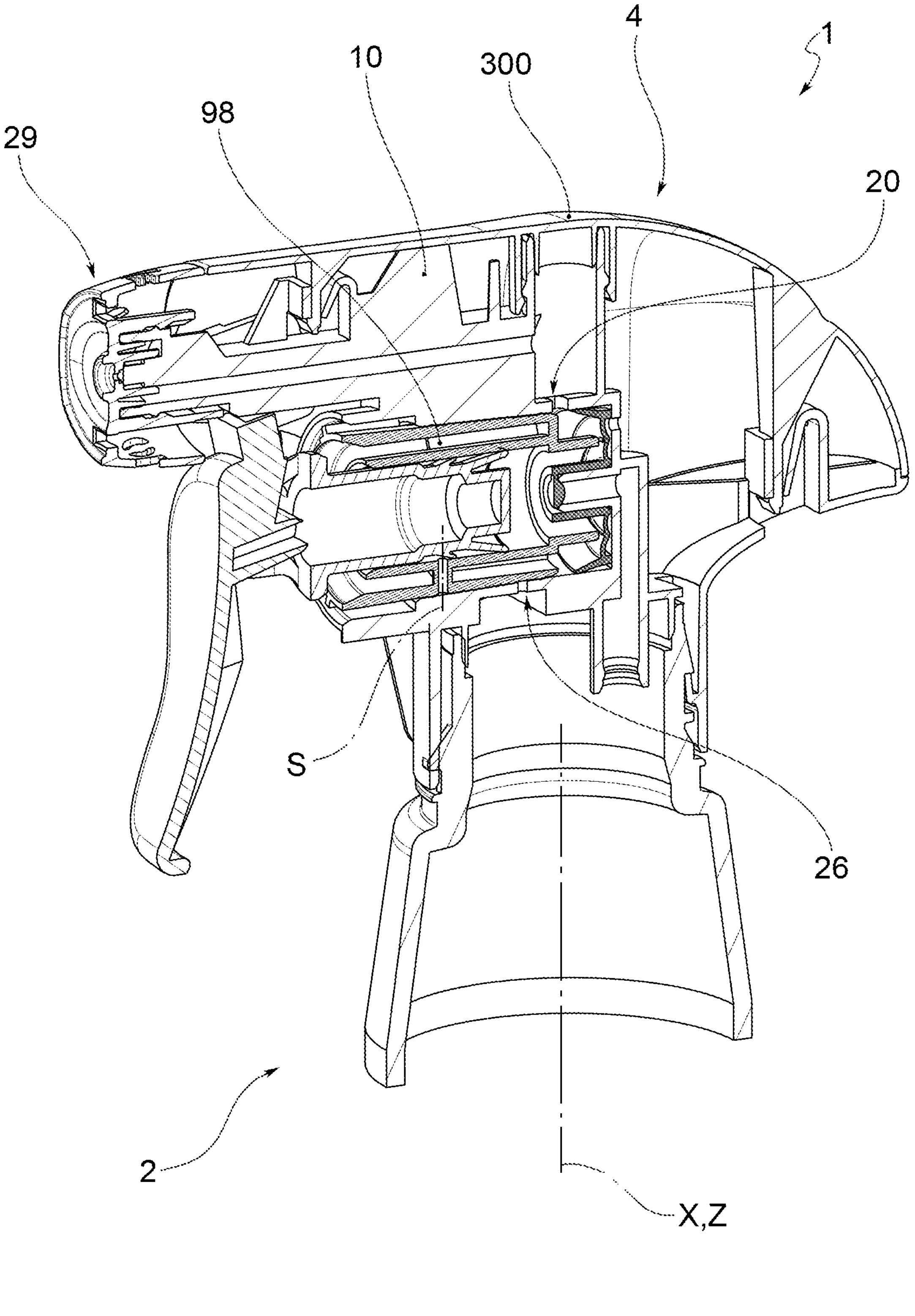
FIG. 4 is a sectional view of the trigger dispensing device in an intermediate trigger actuation configuration.

In particular, the membrane 216 separates from the end wall 36 of the sleeve 30 and allows the product to pass into the valve compartment 25' and then to the dispensing duct, allowing it to be dispensed externally through the nozzle assembly 29 (dispensing step). Specifically, the product wets both the valve compartment 25' and the first sleeve compartment 981. The suction valve means remain in the closed configuration (FIG. 4).

Figure 5:
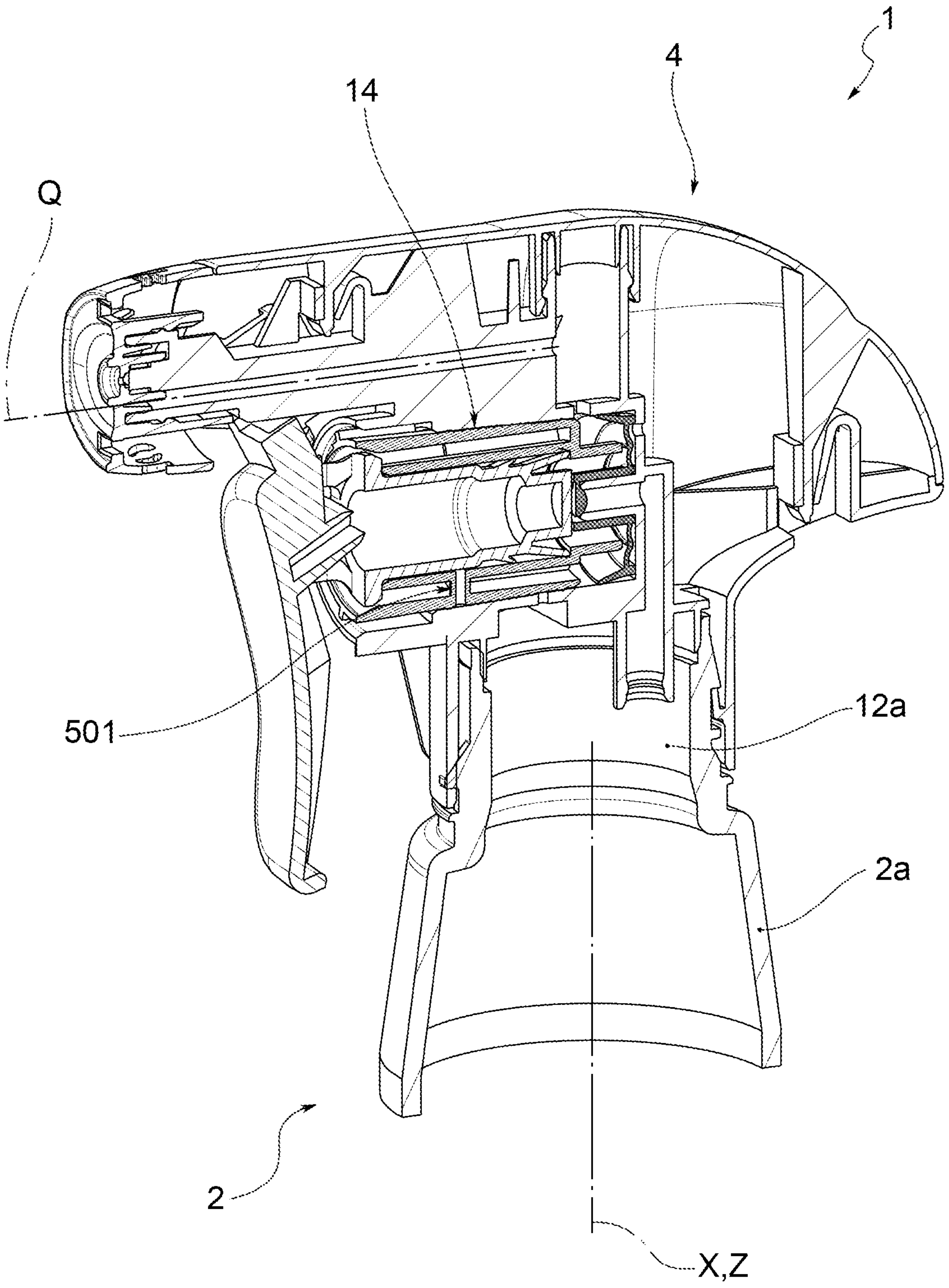
FIG. 5 shows a sectional view of the trigger dispensing head in an end-of-stroke configuration of the piston, with pre-compression valve means in an opening configuration.

Once the trigger 100 and the piston 80 have reached the end-of-stroke position (FIG. 5) and the dispensing step has finished, the trigger 100 is released and the elastic return means operate to return the piston 80 and the trigger 100 to the initial rest position.

Figure 6:
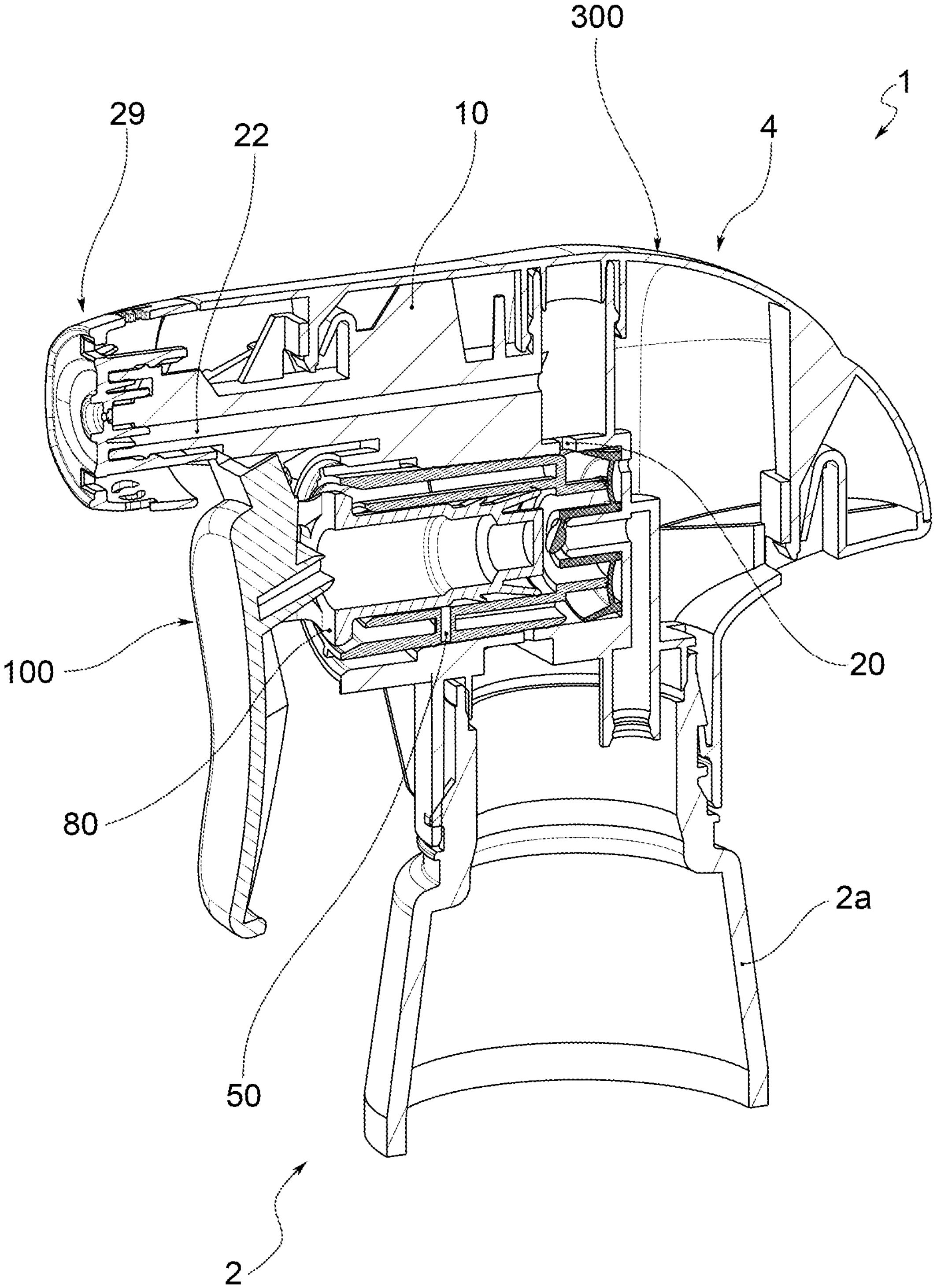
FIG. 6 shows a sectional view of the trigger dispensing device in a trigger release configuration.
Figure 7:
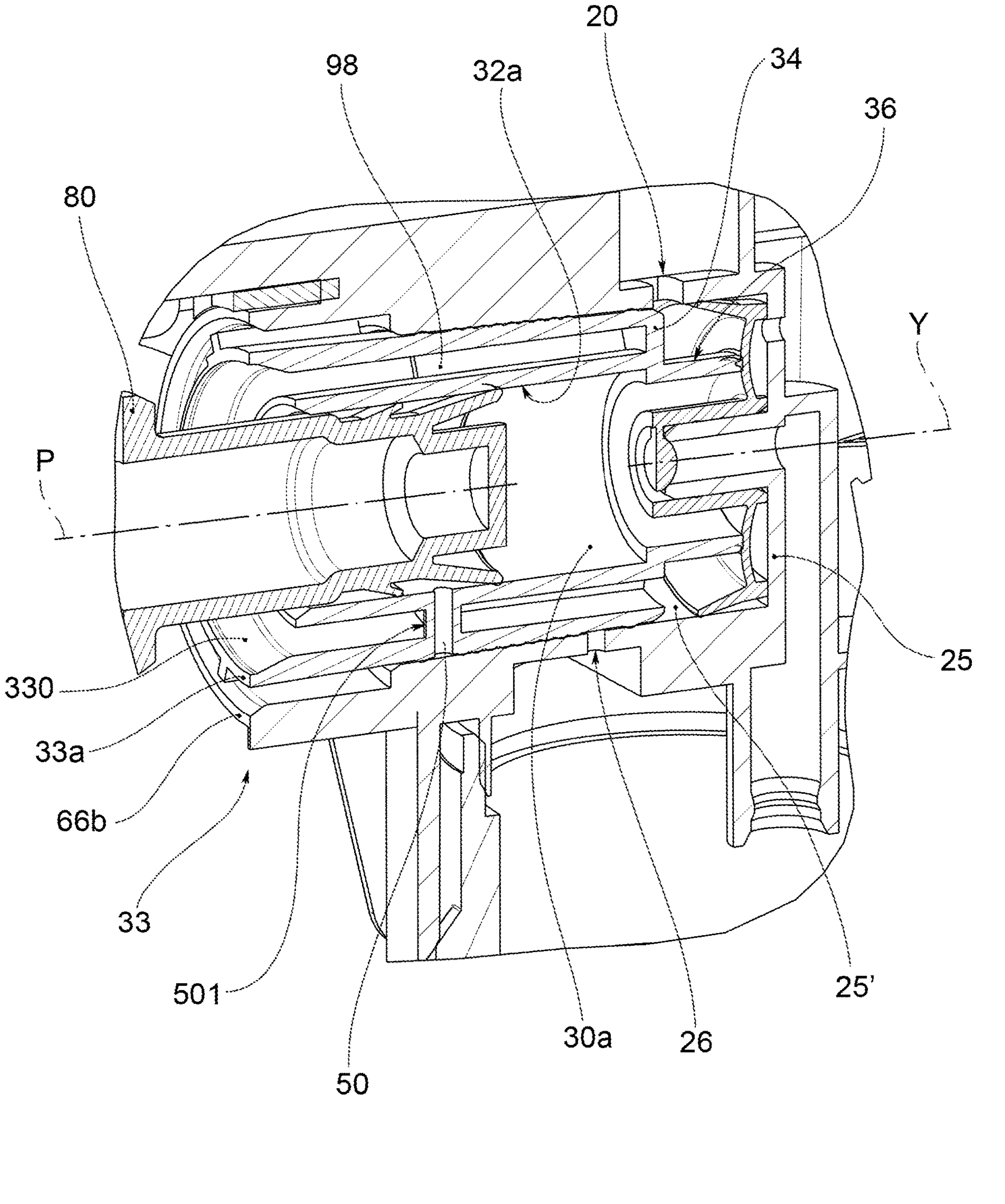
FIG. 7 shows an enlarged detail of FIG. 3.
Figure 8:
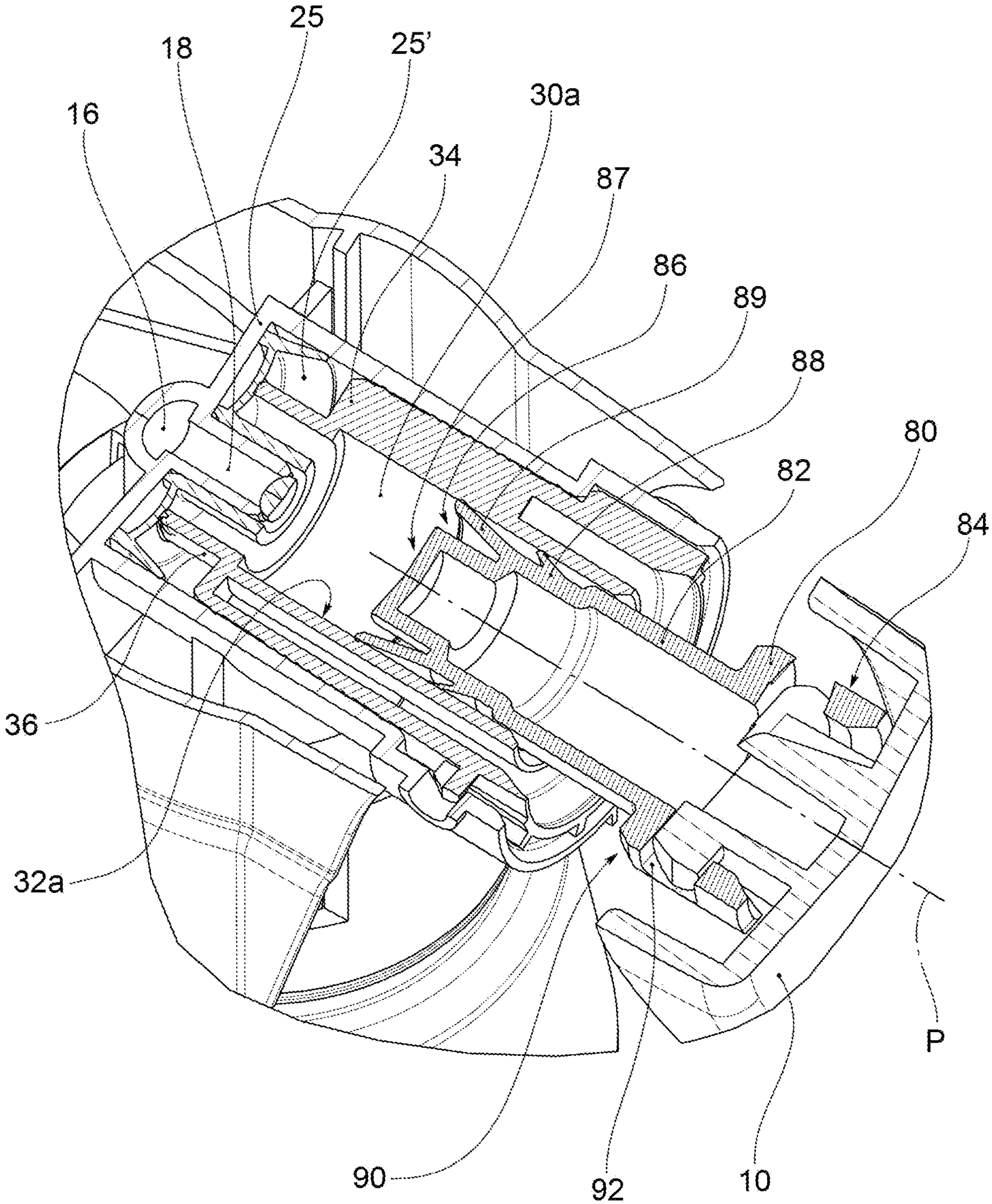
FIG. 8 shows an enlarged detail of a sectional view of the dispensing head of FIG. 3.
Figure 9:
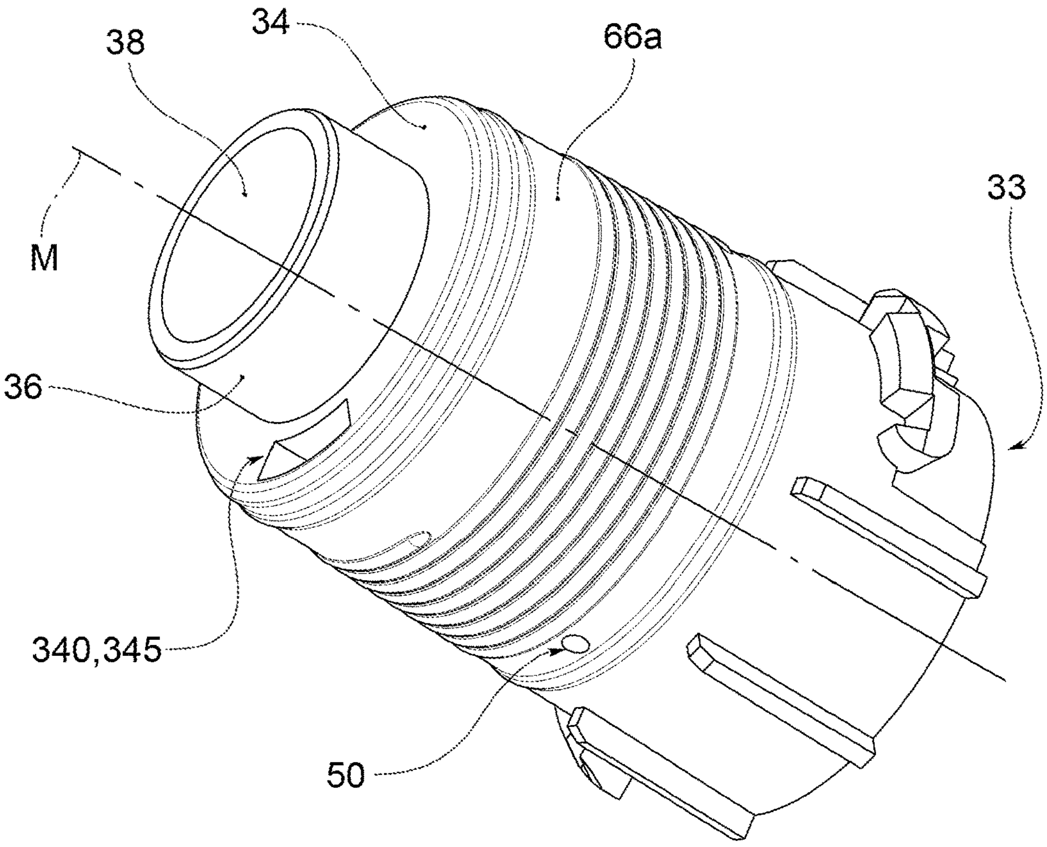
FIGS. 9, 10 and 11 show a sleeve of the dispensing head, a side view thereof and a front view thereof, respectively.

The return of the piston 80 towards the initial rest position causes a depression in the pressure chamber 30*a*, which causes the switching of the suction valve means to an open configuration in which they allow the suction of the product from the suction duct into the pressure chamber 30*a* (FIG. 6). In particular, the flap 212 flexes and separates from the suction mouth 18*a* of the suction duct, allowing the product to pass from the suction duct into the pressure chamber 30*a* (suction step). Furthermore, in the suction step, the internal compartment of the bottle is in communication with the external environment by means of the secondary vent passage 50 and the main vent passage 26.

According to a preferred embodiment, moreover, the head 4 comprises a shell 300 attached to the frame 10 to cover it. Preferably, the shell 300 is applied to the frame 10 by at least one snap coupling.

Innovatively, the dispensing head described above meets the needs of the sector and overcomes the aforementioned drawbacks, insofar as it makes it possible to dispense reduced doses of product while interchanging a limited number of components of the head, i.e., avoiding a complete redesign of the head.

Advantageously, it is possible to utilize the frame of the trigger dispensing heads according to the prior art, adapting it to the needs of the sector for dispensing devices that are intended to dispense reduced doses.

Advantageously, the sleeve is a unique and integrated component that is easily interchangeable.

Advantageously, the sleeve has a labyrinth seal that engages with the cylinder chamber, minimizing possible losses of unwanted product.

It is understood that those skilled in the art, in order to meet contingent needs, could make modifications to the dispensing head described above, all of which are contained within the scope of protection as defined by the following claims.

What is claimed is:

1. A trigger dispensing head applicable to a bottle of a trigger dispensing device for dispensing a product, comprising:

- a frame, suitable for supporting components of the trigger dispensing head, comprising a main opening in communication with an internal compartment of the bottle;
- a cylinder chamber annularly delimited by a cylinder wall having an inner chamber surface, and by a bottom wall at the bottom;
- a manually-operable piston for translating between an initial rest position and a final end-of-stroke position;
- a pressure chamber in which said manually-operable piston operates;
- a suction duct suitable for putting the internal compartment of the bottle in communication with the pressure chamber;
- a dispensing duct suitable for putting the pressure chamber in communication with an external environment;
- valve means for adjusting a flow of the product from the suction duct to the pressure chamber during a suction step and from the pressure chamber to the dispensing duct during a dispensing step; and
- a sleeve having a sleeve axis, housed in the cylinder chamber, comprising:
  - a bottom sleeve wall transverse to the sleeve axis;
  - an annular inner sleeve wall extending from said bottom sleeve wall and annularly delimiting the pressure chamber; and
  - an annular outer sleeve wall extending from the bottom sleeve wall, positioned radially externally spaced from the annular inner sleeve wall and placed in contact with the inner chamber surface;

wherein the sleeve further comprises an annular vent wall that extends radially between the annular inner sleeve wall and the annular outer sleeve wall, internally delimiting a secondary vent passage passing radially in the annular inner sleeve wall and in the annular outer sleeve wall.

2. The trigger dispensing head of claim 1, wherein the secondary vent passage is open on the inner chamber surface and is suitable for putting the internal compartment of the bottle in communication with the external environment in the final end-of-stroke position of the manually-operable piston.

3. The trigger dispensing head of claim 1, wherein the annular inner sleeve wall and the annular outer sleeve wall annularly define an annular sleeve gap.

4. The trigger dispensing head of claim 3, wherein the annular sleeve gap is open at a free sleeve end opposite the bottom sleeve wall.

5. The trigger dispensing head of claim 3, wherein the sleeve comprises a closing wall positioned transversely to the sleeve axis, such as to axially divide the annular sleeve gap into a first sleeve compartment towards the bottom sleeve wall, and an opposite second sleeve compartment.

6. The trigger dispensing head of claim 5, wherein the annular vent wall is axially positioned at the closing wall.

7. The trigger dispensing head of claim 1, wherein the sleeve further comprises a bottom window axially passing through the bottom sleeve wall and positioned within an imaginary plane passing through the sleeve axis and the secondary vent passage.

8. The trigger dispensing head of claim 7, wherein the sleeve, the cylinder wall and the bottom wall define a valve compartment, and wherein the bottom window faces said valve compartment.

9. The trigger dispensing head of claim 5, wherein the sleeve comprises a pair of angularly spaced partition walls that extend from the closing wall to the bottom sleeve wall and define an angular width of the first sleeve compartment.

10. The trigger dispensing head of claim 9, wherein the sleeve further comprises a bottom window axially passing through the bottom sleeve wall and positioned within an imaginary plane passing through the sleeve axis and the secondary vent passage, and wherein the bottom window opens for a portion of a circular crown radially defined between the annular inner sleeve wall and the annular outer sleeve wall angularly between the angularly spaced partition walls.

11. The trigger dispensing head of claim 9, wherein each partition wall is positioned on a respective plane passing through the sleeve axis.

12. The trigger dispensing head of claim 1, wherein a main vent passage is formed in the cylinder wall, wherein the main vent passage puts the main opening in communication with the inner chamber surface, and wherein the annular outer sleeve wall has a labyrinth seal suitable for putting the main vent passage in communication with the external environment.

* * * * *